United States Patent [19]

Burgdorf

[11] 4,375,250
[45] Mar. 1, 1983

[54] SPOT-TYPE DISC BRAKE

[75] Inventor: Jochen Burgdorf, Offenbach-Rumpenheim, Fed. Rep. of Germany

[73] Assignee: ITT Industries, Inc., New York, N.Y.

[21] Appl. No.: 249,257

[22] Filed: Mar. 30, 1981

[30] Foreign Application Priority Data

Apr. 16, 1980 [DE] Fed. Rep. of Germany ....... 3014648

[51] Int. Cl.³ ............................................. F16D 55/46
[52] U.S. Cl. ................................................. 188/72.2
[58] Field of Search ....................... 188/72.2, 136, 135, 188/141 A, 72.4

[56] References Cited

U.S. PATENT DOCUMENTS

| 654,808 | 7/1900 | Sauvage | 188/136 |
| 3,626,485 | 12/1971 | Holloway | 188/72.2 |
| 3,743,060 | 7/1973 | Hendrickson | 188/72.2 |
| 3,890,884 | 6/1975 | Silberschlag | 188/72.4 |
| 4,077,498 | 3/1978 | Brown | 188/72.2 |
| 4,161,238 | 7/1979 | Lasoen | 188/72.2 |

FOREIGN PATENT DOCUMENTS

| 1050623 | 12/1966 | United Kingdom | 188/72.2 |
| 1154233 | 6/1969 | United Kingdom | 188/72.4 |

Primary Examiner—Duane A. Reger
Attorney, Agent, or Firm—John T. O'Halloran; Alfred C. Hill

[57] ABSTRACT

To reduce the brake-application travel necessary for brake shoe actuation, to reduce the brake fluid volume consumption of the brake-shoe-actuating member in a hydraulic brake, to reduce the brake pedal travel required for a braking operation and to improve the efficiency of a floating caliper disc brake, there is inserted a spreading device between the brake-shoe actuating device and the brake pad connecting the circumferential travel of the brake pad caused by engagement with the brake disc into an axial displacement increasing the axial distance between the brake-shoe actuating device and the brake shoe, when the spreading device is moved out of its spring-biased central position into engagement with a supporting surface at the brake housing.

15 Claims, 1 Drawing Figure

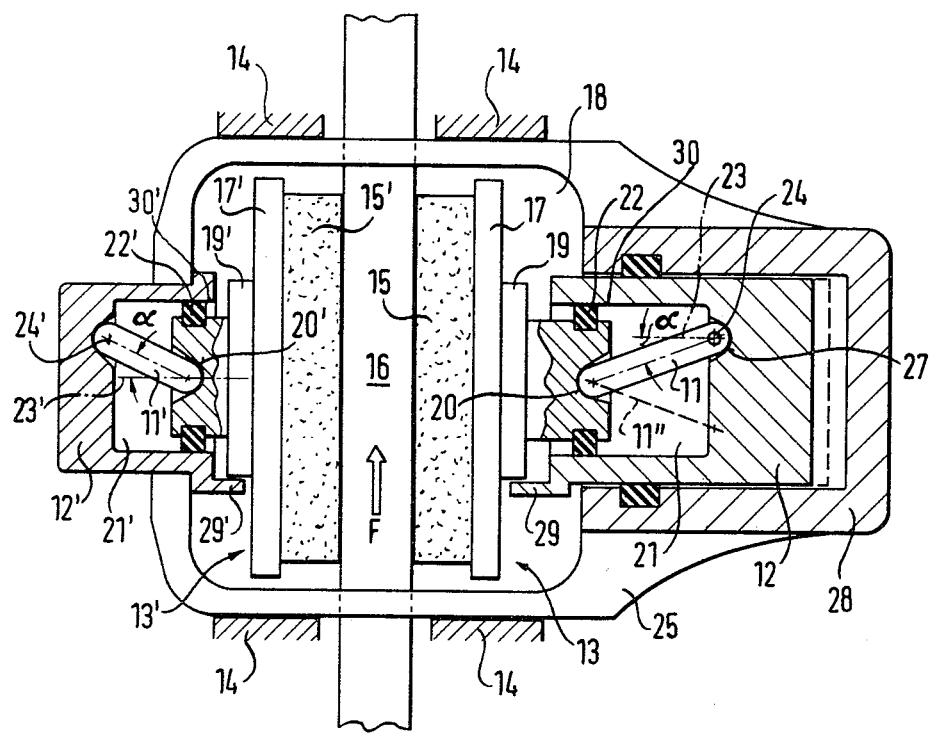

SPOT-TYPE DISC BRAKE

BACKGROUND OF THE INVENTION

The present invention relates to a spot-type disc brake with at least one brake-shoe-actuating member disposed axially slidable in a brake caliper and adapted to be acted upon by a brake force, in particular a hydraulically actuated brake piston, and with a supporting surface taking the circumferential force which acts on the brake shoe during a braking operation.

It is known, for example, from German Patent DE-AS No. 1,251,102 to provide a pivotal connection between the brake piston and the brake pad of a fluid-pressure-actuated spot-type disc brake in order to absorb deformations of the brake members and counterbalance them so as to ensure both a perfect guiding of the brake piston and the brake pad and full engagement of the brake pad with the brake disc under all braking conditions. To this end, the ball-and-socket joint of the known spot-type disc brake, which connects the brake piston with the brake pad backing plate, is formed by a cup whose calotte-shell-shaped bottom is held in abutment with the mating calotte-shell-shaped piston end surface by means of a pin threadedly engaged with the piston and a plate-shaped disc, with a ring of an elastic material being inserted therebetween. However, the known spot-type disc brake does not permit a reduced brake fluid volume consumption during braking nor is its hydraulic efficiency increased.

In another known spot-type disc brake disclosed in U.S. Pat. No. 3,186,518, an inclined thrust member extends from a pivot point on the floating caliper substantially from the disc exit side to the brake shoe, supporting the latter diagonally. In this manner, when the brake shoe moves into engagement with the brake disc, a clamping torque is produced at the brake pad actuated by the inclined thrust member, which torque is transmitted through the floating caliper to the opposite brake shoe. In addition to the clamping force of the hydraulic piston/cylinder arrangement, a supplementary brake force is thereby generated creating a type of wedging action. In this case, a brake power assistance caused by the drag force of the brake disc is present.

SUMMARY OF THE INVENTION

In contrast thereto, it is an object of the present invention not to boost the brake force produced by the brake-shoe-actuating member but only to reduce the brake-actuation travel necessary for actuation of the brake shoes and, particularly in a hydraulic brake, to reduce the brake fluid volume consumption of the brake-shoe-actuating member during a braking operation and to thus reduce the brake pedal travel required for a braking operation.

It is a further object of this invention to improve the efficiency of, in particular, the floating caliper or floating frame hydraulic brakes.

A still further object of the present invention is to provide a simple way of restoring the clearance between the brake disc and the brake shoes following a braking operation.

A feature of the present invention is the provision of a spot-type disc brake comprising at least one brake-shoe-actuating member axially slidably disposed in a brake caliper and adapted to be acted upon by a brake force; a supporting surface disposed in the actuating member to receive a circumferential force acting upon a first brake shoe actuated by the actuating member when the first brake shoe engages an adjacent surface of a brake disc during a braking operation, the first brake shoe being spaced a given distance from the support surface in a brake release position; and an expanding device disposed between the first brake shoe and the actuating member which upon movement of the first brake shoe towards the supporting surface urges the actuating member a predetermined amount away from the first brake shoe.

The amount of travel of the brake-shoe-actuating member includes the distance required to overcome the brake clearance and the distance required to compensate for the elongation and compression of the brake components subjected to the actuating force. Thus, according to the present invention, part of this total travel is performed by the expanding device actuated by the brake shoe. The amount by which the brake shoe-actuating member is forced back by the brake shoe essentially corresponds to the brake clearance produced on brake release as a result of the return motion of the brake shoe into its initial position. Consequently, the brake-shoe-actuating member is only required to travel the actuating distance necessary for overcoming the elongations and compressions occurring within the brake system. At the beginning of a braking action, the brake-shoe-actuating member initially travels to overcome the brake clearance in order to bring the brake shoes into engagement with the brake disc. In this actuating phase, however, appreciable elongations do not yet occur because the forces are still small. Because of the movement of the brake shoe, the distance which the actuating member has covered to overcome the clearance is regained by the actuating member being shifted back a corresponding amount.

The reduction in the actuating travel of the brake-shoe-actuating member affords the substantial advantage of enabling the mechanical or hydraulic actuating device provided for driving the brake-shoe-actuating member and actuated by the vehicle operator's foot or hand, to be provided with a larger transmission ratio so that the force to be exerted by the vehicle operator becomes smaller. A further advantage achieved with the present invention is that it allows a larger brake clearance without the disadvantageous consequence of an increased actuating travel of the brake-shoe-actuating member.

While the present invention is preferably used in fixed or floating caliper hydraulic brakes, it should be understood that the present invention may also be embodied in mechanically actuated brakes.

A preferred embodiment of the present invention is characterized in that an intermediate piston is arranged between the brake shoe and the brake-shoe-actuating member, the intermediate piston being axially slidable at the brake-shoe-actuating member while in the direction of disc rotation the intermediate piston is resiliently yielding until engagement of the brake shoe or the intermediate piston with the supporting surface. A particularly compact construction may be thereby achieved by guiding the intermediate piston substantially axially in an enlarged-diameter cylinder bore of the brake-shoe-actuating member, while an elastic ring is inserted between the intermediate piston and the cylinder bore to permit the limited circumferential movement of the intermediate piston in relation to the brake-shoe-actuating member, with the supporting surface being formed by part of the wall of the cylinder bore. In this arrangement, the intermediate piston is allowed to expand in steps outside the cylinder bore in order to ensure a maximum possible engagement surface with the brake shoe.

A particularly compact and simple embodiment of the present invention includes the expanding device in the form of a thrust rod arranged between the brake-shoe-actuating member and the brake shoe in an inclined manner when viewed in the tangential plane, such that on engagement of the brake shoe with the brake disc the drag force exerted by the brake disc produces the expanding effect between the brake-shoe-actuating member and the brake shoe.

It will be particularly advantageous if the angle α at which the inclined thrust rod extends relative to the axial direction is 20°. This angle will be chosen optimally if the tangent of the angle at which the inclined thrust rod extends relative to the axial direction is smaller and preferably approximately equal to the coefficient of friction of the brake pad. It is thereby ensured that the brake shoe urges the brake-shoe-actuating member back and moves into abutment with its supporting surface. Provided that the tangent of the angle and, thus, the angle becomes smaller, the effects aimed at will be achieved, their magnitude, however, will become less with the angle decreasing. In order to obtain a maximum increase in the efficiency in the presence of a specific brake-shoe displacement travel predetermined by reasons of construction, it will be the aim to provide an angle as large as is just permissible considering the friction ratios.

Further, it is essential that the pivot point of the end of the inclined thrust rod close to the brake shoe is spaced from the axis of the brake-shoe-actuating member at least a distance equal to the distance between the brake shoe and its supporting surface. Otherwise, the thrust rod would be moved beyond the axis of the brake-shoe-actuating member and part of the achievable gains in actuating travel could be lost.

Provided that the brake-shoe-actuating member is a preferable hydraulic brake piston, the present invention provides advantageously for the intermediate piston to be arranged in a blind-end cylindrical bore of the brake piston, which is provided on both sides of the disc and has the inclined thrust rod pivotally mounted on the bottom of these blind-end bores.

If a brake piston is provided on only one side of the disc and the brake force is transmitted to the opposite side of the disc through a floating caliper, the subject of the present invention is advantageously constructed such that a blind-end cylinder device accommodating the inclined thrust rod and intermediate piston is arranged on the side of the floating caliper remote from the brake piston.

It is also essential for the embodiment of the present invention to arrange the brake shoes in the caliper tangentially slidably to enable them to follow the circumferential movement of the brake disc during braking to the degree necessary for pivotal movement of the inclined thrust rod. In the circumferential direction, the brake shoes may be resiliently supported on the brake caliper, or the brake carrier, so as to permit the circumferential movement necessary to pivot the inclined thrust rod during braking.

The elastic ring provided between the intermediate piston and the brake-shoe-actuating member acts simultaneously to somewhat elastically reset the intermediate piston and, thus, the brake shoes relative to the brake-shoe-actuating member following a braking operation, whereby a predetermined nominal clearance will be re-established.

BRIEF DESCRIPTION OF THE DRAWING

The above-mentioned and other objects and features of the present invention and the manner of obtaining them will become more apparent by reference to the following description taken in conjunction with the drawing, the single FIGURE of which is a top plan view, partially in cross section of a floating-frame or sliding-caliper spot-type disc brake in accordance with the principles of the present invention.

DESCRIPTION OF THE PREFERRED EMBODIMENT

Referring to the FIGURE, a floating frame or caliper 25 is axially slidably guided in a brake carrier 14 indicated only schematically. The guides are so arranged that brake carrier 14 is able to take the drag forces transmitted to floating caliper 25 during rotation of disc 16 in the direction of arrow F in the presence of a braking action.

Brake disc 16 has applied to one side thereof brake shoe 13 including brake pad 15 and backing plate 17 carrying the same. Brake shoe 13' including brake pad 15' and backing plate 17' carrying the same is applied to the other side of disc 16.

Brake shoes 13 and 13' are arranged within the frame opening 18 of floating caliper 25 which is constructed in the manner of a frame. Brake shoes 13 and 13' are carried by stepped intermediate pistons 19 and 19', respectively, fixedly attached thereto which have a relatively large surface in abutment with backing plates 17 and 17', respectively, and a reduced diameter portion received in bores 21 and 21', respectively. The blind-end cylindrical bore 21 is provided in a hydraulic brake piston 12 adjacent disc 16.

The reduced diameter portion of intermediate piston 19 engaged in blind-end bore 21 has an annular groove on its periphery into which an elastic ring 22 is inserted to establish the connection between intermediate piston 19 and brake piston 12.

On the surface remote from brake disc 16, intermediate piston 19 has a cup-shaped recess 20 for pivoting engagement with one end of an inclined thrust rod 11. Inclined thrust rod 11 extends from the cup-shaped recess 20 at an angle α relative to axis 23 with a tendency towards the direction of disc rotation F and terminates at the bottom of blind-end bore 21 where it is pivoted about an axis 24 perpendicular to the plane of the drawing. Here, too, thrust rod 11 may be received in a cup-shaped recess 27.

Brake piston 12 is received in a cylinder 28 adapted to be connected to a hydraulic thrust shaft or conduit constitutes a part of floating caliper 25.

On the side of brake disc 16 remote from piston 12, floating caliper 25 accommodates a blind-end cylindrical device 12' in which, similar to intermediate piston 19, an intermediate piston 19' is axially slidably guided through an elastic ring 22' while being slightly resiliently yielding in the circumferential direction. Elastic ring 22' is in abutment with its associated blind-end cylindrical bore 21'. Extending between a ball-socket-like recess 20' and bearing 24' in the bottom of blind-end cylindrical device 12' is again an inclined thrust rod 11' which is constructed similar to inclined thrust rod 11 and is arranged at an angle α relative to axis 23'.

The operation of the spot-type disc brake of the present invention is as follows.

During a braking action, brake piston 12 will be advanced in the direction of brake disc 16. As soon as brake pad 15 engages the surface of disc 16, brake shoe 13 will be somewhat entrained in the circumferential direction of disc 16, causing elastic ring 22 to be slightly compressed in the circumferential direction. As a result, inclined thrust rod 11 pivots somewhat about pivot point 24 with angle α getting smaller, which corresponds to an extension of thrust rod 11 so that piston 12 assumes the position indicated by dashed lines in the drawing. This corresponds to a reduced fluid volume consumption during braking. In this arrangement, intermediate piston 19 moves into abutting engagement with a supporting surface 30 provided on the inner wall of bore 21.

At the same time, brake shoe 13' is likewise moved into engagement with the opposite side of brake disc 16. On this side, too, there occurs a slight entrainment of brake shoe 13' in opposition to the elastic force of ring 22', whereby inclined thrust rod 11' pivots a correspondingly slight amount with angle α becoming smaller and piston 19' abutting a supporting surface 30' provided on the inner wall of bore 21'. Accordingly, there occurs also on this side a minor extension of the structure including brake-shoe-actuating member 12', brake shoe 13' and the mechanical members interposed therebetween. Thus, a reduced volume consumption is achieved on either side of brake disc 16 during braking which amounts to an improvement in the hydraulic efficiency. It is even possible to realize a negative piston travel while a suitable amount of energy is gained. This depends on the angular position of inclined thrust rods 11 and 11' and on the distance intermediate pistons 19 and 19' may cover within blind-end cylindrical bores 21 and 21' against the spring force of rings 22 and 22' in the circumferential direction during braking.

When the brake is released, a clearance is established by elastic rings 22 and 22' on both sides of disc 16 due to the elastic return motion of intermediate pistons 19 and 19'. Thus, elastic rings 22 and 22' act simultaneously in the manner of a roll-back seal.

In order to avoid that during a braking action in reverse gear, i.e., with brake disc 16 rotating in opposition to the direction of arrow f, an effect contrary to the one described hereinabove occurs, a preferred improvement of the present invention provides for stops 29 and 29' at the end of brake piston 12 and blind-end cylindrical device 21' close to the disc entry side, the stop being in contact with the end of intermediate piston 19 or 19' close to the disc entry side. Under normal braking conditions, intermediate pistons 19 and 19' are allowed to lift clear of stops 29 and 29'. In the presence of a braking action in reverse gear, however, intermediate pistons 19 and 19' are in safe engagement with stops 29 and 29', thereby effectively preventing an otherwise feared receding motion of intermediate pistons 19 and 19' into blind-end cylindrical bores 21 and 21'.

It should be understood that the subject of the present invention is also applicable to a braking action in reverse gear by arranging another inclined thrust rod between intermediate pistons 19 and 19' and the bottoms of brake-shoe-actuating members 12 and 12' at an opposite and equal angle α which is indicated in the Figure by a dashed line 11" in brake piston 12. In such an arrangement, however, inclined thrust rod 11 or 11", whichever is not currently used during a specific braking action, must be axially slidable within its pivotal mounting.

While I have described above the principles of my invention in connection with specific apparatus, it is to be clearly understood that this description is made only by way of example and not as a limitation to the scope of my invention as set forth in the objects thereof and in the accompanying claims.

I claim:

1. A spot-type disc brake comprising:
   at least one brake-shoe-actuating member axially slidably disposed in a brake caliper and adapted to be acted upon by a brake force;
   a supporting surface disposed in said actuating member to receive a circumferential force acting upon a first brake shoe actuated by said actuating member when said first brake shoe engages an adjacent surface of a brake disc during a braking operation, said first brake shoe being spaced a given distance from said support surface in a brake release position; and
   an expanding device disposed between said first brake shoe and said actuating member which upon movement of said expanding device towards said supporting surface urges said actuating member a predetermined amount away from said first brake shoe.

2. A disc brake according to claim 1, wherein said expanding device includes
   a first intermediate piston disposed coaxial of a longitudinal axis between said first brake shoe and said actuating member, said first intermediate piston being axially slidable relative to said actuating member and resiliently yieldable a limited circumferential amount in the direction of rotation of said disc until said first intermediate piston abuts said supporting surface.

3. A disc brake according to claim 2, wherein said first intermediate piston is guided substantially axially in a coaxial blind-end cylindrical bore of said actuating member,
   a first elastic ring is disposed between the outer surface of said first intermediate piston and a coaxial surface of said bore to render said first intermediate piston resiliently yieldable said limited circumferential amount relative to said actuating member, and
   said supporting surface is a portion of said coaxial surface of said bore.

4. A disc brake according to claim 3, wherein said first intermediate piston is a stepped piston having its larger diameter portion disposed outside of said bore adjacent said first brake shoe.

5. A disc brake according to claims 3 or 4, wherein said expanding device further includes
   a first thrust rod disposed between said actuating member and said first intermediate piston in an inclined manner relative to said axis such that upon engagement of said first brake shoe with said disc a drag force exerted by said disc on said first brake shoe moves said first thrust rod to produce an expanding force between said actuating member and said first intermediate piston.

6. A disc brake according to claim 5, wherein said first thrust rod is inclined with respect to said axis at an angle of 20° in its rest position.

7. A disc brake according to claim 5, wherein
said first thrust rod is inclined with respect to said axis at a given angle in its rest position whose tangent is smaller than the coefficient of friction of a brake pad of said first brake shoe.

8. A disc brake according to claim 5, wherein
said first thrust rod is inclined with respect to said axis at a given angle in its rest position whose tangent is approximately equal to the coefficient of friction of a brake pad of said first brake shoe.

9. A disc brake according to claim 5, wherein
said actuating member is a hydraulic brake piston having said blind-end cylindrical bore disposed therein adjacent said disc, and
said first thrust rod is pivotally mounted in the blind end of said cylindrical bore.

10. A disc brake according to claim 9, wherein
said brake piston is disposed on one side of said disc and said brake force is transmitted to a blind-end cylindrical device disposed on the other side of said disc coaxial of said axis by said caliper, said blind-end cylindrical device accommodating therein a second intermediate piston abutting a second brake shoe disposed adjacent said other side of said disc and a second thrust rod disposed between the bottom of said blind-end device and an adjacent surface of said second intermediate piston in an inclined manner relative to said axis such that upon engagement of said second brake shoe with said disc said drag force exerted by said disc on said second brake shoe moves said second thrust rod to produce an expanding force between said second intermediate piston and the bottom of said blind-end device.

11. A disc brake according to claim 10, further including
a second elastic ring disposed between the outer surface of said second intermediate piston and an inner surface of said blind-end device to render said second intermediate piston resiliently yieldable said limited circumferential amount.

12. A disc brake according to claim 1, wherein
said expanding device includes
a thrust rod disposed between said actuating member and said first brake shoe in an inclined manner relative to a longitudinal axis of said actuating member such that upon engagement of said first brake shoe with said disc a drag force exerted by said disc on said first brake shoe moves said thrust rod to produce an expanding force between said actuating member and said first brake shoe.

13. A disc brake according to claim 12, wherein
said thrust rod is inclined with respect to said axis at an angle of 20° in its rest position.

14. A disc brake according to claim 12, wherein
said thrust rod is inclined with respect to said axis at a given angle in its rest position whose tangent is smaller than the coefficient of friction of a brake pad of said first brake shoe.

15. A disc brake according to claim 12, wherein
said thrust rod is inclined with respect to said axis at a given angle in its rest position whose tangent is approximately equal to the coefficient of friction of a brake pad of said first brake shoe.

* * * * *